(12) United States Patent
Wammes et al.

(10) Patent No.: US 6,353,294 B1
(45) Date of Patent: Mar. 5, 2002

(54) OPERATIONAL METHOD AND ELECTRONIC BALLAST FOR A DISCHARGE LAMP COMPRISING DIELECTRICALLY IMPEDED DISCHARGES

(75) Inventors: Klaus Wammes, Alsheim; Lothar Hitzschke, Munich; Frank Vollkommer, Buchendorf, all of (DE)

(73) Assignee: Patent-Treuhand-Gesellschaft fuer elektrische Gluehlampen mbH, Munich (DE)

( * ) Notice: Subject to any disclaimer, the term of this patent is extended or adjusted under 35 U.S.C. 154(b) by 0 days.

(21) Appl. No.: 09/763,701
(22) PCT Filed: Aug. 26, 1999
(86) PCT No.: PCT/DE99/02681
  § 371 Date: Feb. 26, 2001
  § 102(e) Date: Feb. 26, 2001
(87) PCT Pub. No.: WO00/13204
  PCT Pub. Date: Mar. 9, 2000

(30) Foreign Application Priority Data

Aug. 26, 2000 (DE) .......................................... 198 39 336

(51) Int. Cl.$^7$ .............................................. H05B 37/02
(52) U.S. Cl. ........................ 315/246; 315/268; 315/276; 315/277
(58) Field of Search .................................. 315/276, 277, 315/287, 246, 260, 268

(56) References Cited

U.S. PATENT DOCUMENTS 6,084,360 A * 7/2000 Yokokawa et al. ......... 315/287

FOREIGN PATENT DOCUMENTS

| EP | 0 604 902 | 7/1994 |
| EP | 0 781 078 | 6/1997 |
| EP | 0 817 542 | 1/1998 |
| EP | 0 975 204 | 1/2000 |
| GB | 2 047 486 | 11/1980 |
| WO | 94/23442 | 10/1994 |
| WO | 98/35536 | 8/1998 |
| WO | 99/46963 | 9/1999 |

* cited by examiner

*Primary Examiner*—David Vu
(74) *Attorney, Agent, or Firm*—Carlo S. Bessone

(57) ABSTRACT

A description is given of an operating method for a discharge lamp with dielectrically impeded discharges and also a corresponding ballast and illumination system. The invention is directed at withdrawing the external lamp voltage across the discharge lamp in order to produce a back ignition in the lamp by virtue of an internal counterpolarization. The back ignition improves the efficiency of the lamp operation and makes it possible to construct a very small, lightweight ballast.

19 Claims, 6 Drawing Sheets

OPERATIONAL METHOD AND ELECTRONIC BALLAST FOR A DISCHARGE LAMP COMPRISING DIELECTRICALLY IMPEDED DISCHARGES

TECHNICAL FIELD

The present invention relates to an operating method and a corresponding electronic ballast for a discharge lamp. In this case, the operating method and the ballast relate to a specific type of discharge lamp, in which so-called dielectrically impeded discharges are utilized to generate light. In order to produce such discharges, a dielectric layer is situated between at least one of the discharge electrodes and the discharge medium of the discharge lamp. The technology of discharge lamps with dielectrically impeded discharges is not discussed in detail here and, in this regard, reference is made to the prior art.

PRIOR ART

Technical development in this field has principally been concerned heretofore with the discharge lamp as such. One exception to this is an earlier patent application in respect of a relevant operating method with pulsed active power coupling into the discharge lamp. In this respect, reference is made to WO 94/23442, whose disclosure content is incorporated here by reference. The operating method presented therein forms the foundation for the invention described below.

In this case, the present invention is concerned with converting the operating procedure which is described in principle in the cited prior art into an operating method which is particularly advantageous in terms of electrical engineering, and an associated electronic ballast. When developing such an operating method and ballast, the aim generally is to fulfil various quality criteria in an overall compromise which is as favorable as possible. Firstly, an electronic ballast should be operated as power-efficiently as possible in order to obtain, together with the efficiency of the lamp, a good overall efficiency of an illumination system comprising discharge lamp and ballast.

A second aspect concerns the electronic ballast having a compact and lightweight design made possible by a corresponding operating method, which ballast, in this respect, is also suitable for installation in the case of confined space conditions or weight restrictions. This has a significant part to play precisely in the areas of application which are of particular interest with regard to discharge lamps with a dielectrically impeded discharge. Examples are backlighting systems for flat screens or copying lamps, which will be discussed further on in the description.

Finally, economic advantages with regard to mass production costs and service life and frequency of failure are intended to be attained.

With regard to the prior art, reference is furthermore made to the following documents: WO-A-98/35536 discloses an operating method for silent discharge lamps in which, during rising and also during falling edges of the lamp voltage, excursions are represented in the lamp current, ignitions being respectively ascribed to said excursions. EP-A-604902 relates to a plasma screen in whose cells image data contents can be written, held and erased according to a so-called "memory principle". To that end, a distinction is made between writing pulses, maintaining pulses and erasing pulses.

SUMMARY OF THE INVENTION

The invention is based on the technical problem, proceeding from the technical teaching of WO 94/23442, of specifying a particularly favorable operating method using a ballast, and an illumination system and ballast designed for this.

For this purpose, the invention provides an operating method for a discharge lamp having a dielectric layer between at least one electrode and a discharge medium using a ballast having a power-supplied primary circuit, a secondary circuit containing the discharge lamp, and also a transformer which connects the primary circuit to the secondary circuit, in which method a voltage pulse is impressed on the secondary circuit from the primary circuit via the transformer, which voltage pulse leads to an external voltage effecting an ignition across the discharge lamp and to an internal counterpolarization in the discharge lamp, and, after the ignition by the external voltage, a sufficiently early countervoltage pulse is impressed from the primary circuit via the transformer into the secondary circuit and withdraws the charge effecting the external voltage still present across the discharge lamp, until the internal counterpolarization in the discharge lamp leads to the back ignition, characterized in that the voltage pulse is impressed according to the flyback converter principle, and the countervoltage pulse according to the forward converter principle, from the primary circuit into the secondary circuit.

Furthermore, the invention relates to a ballast which is designed for the operating method according to the invention, and also to an illumination system having a discharge lamp and such a ballast.

The various dependent claims relate to preferred refinements of the invention.

The invention thus provides an operating method for a discharge lamp of the type already described, in which a ballast is used. For the purposes of this invention, this ballast, which is preferably an electronic ballast, comprises a primary circuit which is supplied with power in a manner that is of no further interest here, and a secondary circuit into which the lamp is intended to be connected or is connected. The primary circuit and the secondary circuit are coupled via a transformer via which power can be coupled into the secondary circuit from the primary circuit.

Provision is now made for coupling a voltage pulse into the secondary circuit via the transformer, which voltage pulse leads to an external voltage across the discharge lamp. The subsequent behavior of the discharge lamp itself is of importance for the concept underlying the invention. Specifically, it has been found that, in the discharge lamps with dielectrically impeded discharges which are considered here, a counterpolarization occurs in the discharge lamp as a dielectric reaction to the external voltage and as a result of a discharge ignited by an external voltage.

To be precise, after the ignition voltage has been reached, discharges are formed in the discharge medium, as is described in more detail in the foundation application pertaining to the operating method, to which reference has already been made. As a consequence, charge carriers move to the dielectric layer on one of the electrodes and accumulate to an increasing extent on the dielectric layer. This creates an internal counterpolarization relative to the external field which increases until an overall field is no longer present in the discharge medium, which also means that current can no longer flow through the lamp. As a result, the discharge medium has changed from a behavior acting as an ohmic load—although with time-variable resistance—to an electrical behavior manifested as capacitance.

Added to this is the fact that further capacitances are connected in series with the discharge medium, to be precise in particular through one or a plurality of dielectric layers on the electrodes.

Proceeding from this physical behavior of the discharge lamp, the fundamental concept of the invention consists, then, in not interpreting this internal counterpolarization as a disturbing effect, but rather integrating it functionally into the operating method and also into the functional principle of the associated ballast. In this sense, the operating method according to the invention provides for the external voltage across the discharge lamp, which originally caused the counterpolarization just described, to be withdrawn again from the discharge lamp sufficiently rapidly in order to have the internal counterpolarization lead to a further ignition in the opposite direction after the first ignition effected by the external voltage. This second ignition is in this case designated as back ignition and is not attributed, at any rate not completely, to an external voltage but rather, at any rate at least partly, to the internal counterpolarization.

In this application, for the sake of clarity of explanation, it is thus argued that the external voltage across the discharge lamp or the internal counterpolarization effects an ignition. For the sake of completeness, however, this must also be expanded by stating that the ignition behavior of the lamp depends on a number of further parameters. In particular, the edge steepness or the dissipation when building up a voltage across the lamp or a field in the lamp has a significant part to play. This means that, for example, an ignition on account of an external voltage across the discharge lamp takes place at smaller voltage values if said external voltage is built up very rapidly. This basically empirical result can probably be explained by the fact that the electrodes can follow the field rise more poorly, possibly also by the fact that with a steeper voltage rise and thus a larger proportion of high-frequency Fourier components on the voltage profile, the high-frequency conductivity in particular of the dielectric is improved and the field actually prevailing in the discharge medium is thus enlarged.

Other time parameters also play a part, for instance the so-called dead time between the individual active power pulses. The longer this dead time is chosen to be, the smaller the residual ionization which remains at the end of the dead time, and thus the higher the voltage which is necessary for renewed ignition.

The problems associated with these relationships will not be discussed further in the rest of this application because they are not directly connected with the principle of this invention. However, it must be kept in mind that a significant part is played not only by the pure voltage values and the lamp parameters for the ignition and back ignition behavior, but also by the temporal parameters of the operating method.

With regard to the temporal order and the designations first ignition and back ignition used below, it should be noted that this operating method, apart from the start of the discharge lamp, is of course directed at a continuous discharge operation, so that the back ignition is again followed by a "forward ignition", that is to say first ignition. However, only a basic unit of this repeated sequence will be considered in the description of the invention, in which case, for the sake of simplicity, the "first" ignition is referred to the external voltage. Moreover, it is not absolutely necessary here for the operating method overall to be strictly periodic.

Accordingly, the invention also relates to an illumination system, in this case meaning a system comprising a discharge lamp and a ballast which are designed for operation according to the operating method according to the invention. To that end, the ballast must be suitably coordinated with the respective discharge lamp, with regard to the method of functioning intended by the invention, above all with regard to the capacitance.

The back ignition according to the invention has the following essential advantages: firstly, at least a considerable part of the energy which has passed to an extent unavoidably into the counterpolarization is converted into light generation by the back ignition and the overall energy utilization is thus improved. Although the counterpolarization could also be suitably reduced in such a way that the energy stored therein can flow back into the primary circuit via the transformer, this is, of course, associated with an overall increase in losses, because the proportion which has passed back into the primary circuit must again pass via the transformer and the secondary circuit into the discharge lamp in order to be made utilizable.

Furthermore, it emerges from the improved energy utilization and, in particular, also in comparison with a reduction of the counterpolarization in the form of feedback into the primary circuit that the circuit of the ballast can be designed to be smaller for a given discharge lamp power. This follows simply from the fact that, with the aid of the invention, the same discharge lamp power can be supplied with a primary circuit which is designed toward smaller power levels, to be precise by virtue of the better energy utilization on the secondary-circuit side and by virtue of the obviation or reduction of the need to feed "consumed" amounts of energy on the secondary-circuit side back to the primary-circuit side. To the extent of an improvement of the energy utilization as such, the secondary-circuit side can also be designed toward smaller power levels.

Finally, it has also been found that the back ignition is advantageous for the discharge physics in the discharge lamp itself, in that it homogenizes the local distributions of different chemical species and charge carriers. Thus, the mode of operation according to the invention, with back ignitions following first ignitions, should not be understood in the sense that back ignitions are to an extent accepted for electrical engineering reasons, rather that, both from the perspective of the physics of the discharge medium and from an electrical engineering standpoint, it represents a particularly favorable realization of the underlying pulsed mode of operation in accordance with the application to which reference has been made.

From the inventors' viewpoint, it is useful, for an understanding of the effects underlying the invention, to make it clear that in the discharge lamps considered by the invention, in comparison with metals, charge carrier concentrations occur which are typically lower by many orders of magnitude, so that external fields can be compensated by an opposing field only with the covering of comparatively larger distances by the respective mobile charge carriers. These very much larger distances in comparison with quasi instantaneously shielding metals result in time delays, from which it has been found that they can already constitute a significant effect in the range of typical pulse frequencies of the pulsed mode of operation considered here.

What the invention involves, then, is a matter of leading the secondary circuit to withdraw the external voltage from the discharge lamp in the time period between the first ignition and the back ignition. As explained below, this can be done, in particular, by means of a pulse which is coupled in at a suitable location and supports the charge transfers according to the invention in the secondary circuit. On the other hand, this can also be done by allowing the secondary circuit to oscillate through as an isolated resonant circuit or in another way. Reference is made to the disclosure content of the parallel application "Electronic ballast for discharge lamp with dielectrically impeded discharges" by the same applicant on the same application day and with the file reference 198 39 329.6.

According to a more specific aspect of the invention, the back ignition in the discharge lamp is also used for a further function over and above the aspect of improved energy utilization. This further function concerns the demagnetization of the transformer in the ballast.

In this respect, it must firstly be explained that in the case of a ballast having the above-described construction comprising a primary circuit and a secondary circuit connected to the primary circuit via a transformer, in the case of active power coupling into the secondary circuit in a pulsed manner, at any rate in the case of uses with a discharge lamp according to the invention, a certain residual magnetization remains in the transformer after the first ignition in the jargon of this application. In the prior art, a very large number of different possibilities have been proposed for reducing this residual magnetization in order that the transformer is not driven directly into magnetic saturation during continuous operation by amounts of residual magnetization which repeatedly build up on one another. By way of example, it is possible to use circuits comprising demagnetization coils and diodes, said circuits being connected parallel with the primary side of the transformer. An example of a relatively complicated solution is shown by U.S. Pat. No. 4,739,285. At any rate, conventional ballasts from the prior art have, in principle, demagnetization circuits configured in some way.

According to the invention, then, in conjunction with the withdrawal of the external voltage or the charge effecting the latter from the discharge lamp in preparation for the back ignition, at least a considerable part of the residual magnetization in the transformer is removed at the same time. As a result, depending on the exact embodiment of the circuit, demagnetization circuits according to the prior art can either be completely omitted or actually be designed with regard to distinctly smaller amounts of residual magnetization. In particular, it is alternatively possible to work without any demagnetization circuit, in that the secondary-circuit side, as a result of the back ignition, largely consumes the amount of energy corresponding to the residual magnetization from the transformer and any remaining small amount of energy can, if appropriate, be suitably fed back into the primary circuit through the transformer itself, but does not necessarily have to be fed back. This will be explained in further detail below.

Finally, it must be established here that the residual magnetization in no way has to be returned to zero after the back ignition in the case of this invention. More generally, it is not necessary for the secondary circuit to become entirely energy-free after the back ignition. All that is crucial is that a saturation state of the transformer be avoided. Furthermore, a voltage possibly remaining across the discharge lamp—taking account of the steepness of the edges occurring—must not, of course, reach the ignition voltage. In this sense, the associated claims should be understood such that the intention is to make at least a contribution to the demagnetization of the transformer.

An advantage of the invention's demagnetization of the transformer by the reduction of the external voltage across the discharge lamp and the back ignition is firstly the possibility of either avoiding demagnetization circuits entirely or designing them to be smaller. The preferred case is the one in which the ballast according to the invention has no separate demagnetization circuit. As a result, the circuit not only becomes more efficient but also simpler and less expensive. The omission of the components associated with a conventional demagnetization circuit means that it is also possible to achieve a gain in reliability. In particular, however, it has been found to be an essential advantage of the invention that corresponding ballasts can be made quite considerably much smaller and lighter than conventional comparison circuits. This is quite a considerable advantage for many applications, for example in the areas of copying lamps or of flat screen backlighting systems already mentioned.

Finally, complete DC isolation between the primary-circuit side and the secondary-circuit side can also be achieved by the transformer if no such demagnetization circuits which connect these two circuits are present. This is highly desirable for safety reasons.

According to the characterizing part of claim 1, the invention relates to a concrete circuit form for the operating method that has already been generally described. In this case, after the production of the first ignition, a second voltage pulse of opposite polarity to the first voltage pulse is impressed from the primary circuit via the transformer into the secondary circuit. This second voltage pulse withdraws from the discharge lamp the charge introduced onto the discharge lamp by the first voltage pulse—with a corresponding charge-reversal time delay—or the charge still situated on the discharge lamp after the first ignition, and thus leads to a back ignition, generally with additional coupling-in of energy into the secondary circuit. The internal counterpolarization cannot follow this external voltage drop rapidly enough, so that the electric field originally disappearing in the discharge medium rises again with an opposite polarity to the original field direction and exceeds the ignition field strength in the process. In this case, it is conceivable, in principle, that the charge is still practically completely present on the discharge lamp, or else that it has to a certain extent already drained from the discharge lamp as a result of an oscillation of the secondary circuit.

The fact of whether a considerable part of the charge has already drained from the discharge lamp at the instant of the countervoltage pulse depends not only on the time interval between the first voltage pulse and the countervoltage pulse but also on the oscillation frequency of the secondary circuit in this intermediate phase. In this phase, the secondary circuit is a largely isolated resonant circuit at any rate during the primary-circuit clocking already mentioned, particularly if, according to the invention, no additional demagnetization circuits are provided between primary circuit and secondary circuit. With the invention, however, the case is considered in which the draining of the charge has not already led to a back ignition in the discharge lamp without a further countervoltage pulse.

In this case, there are two different possibilities for the invention with regard to the time period elapsing between the first ignition as a result of the external voltage and the back ignition on account of the countervoltage pulse. In one case, this time period is chosen to be sufficiently short, so that the first ignition and the back ignition can be interpreted as a uniform active power pulse in the sense of the pulsed mode of operation of the discharge lamp which is considered here.

In the other case, this time interval is so long that this time period can already be considered as the dead time of the pulsed active power method. To that end, it should lie, in particular, in the range from 5 $\mu$sec to 1 msec. In this case, in the more specific configuration of the invention associated with the coupling-in of the countervoltage pulse, it is necessary that the draining of the charge from the discharge lamp which has taken place in the sense of a free oscillation of the secondary circuit has not already led to a back ignition. Rather, this draining must take place sufficiently slowly. Therefore, this mode of operation is particularly suitable for low natural frequencies of the secondary circuit, preferably below 20 kHz, in particular below 10 or 5 kHz. Such low natural frequencies of the secondary circuit occur, in particular, with very large lamp capacitances, that is to say primarily in very large lamps.

The invention thus also relates to a ballast which operates as a flyback converter in order to produce the first ignition and thereupon generates the second external voltage pulse for the back ignition as a forward converter.

In the case of the flyback converter, as a result of the transformer being charged through the primary circuit, energy is stored in the transformer, but the ignition voltage of the discharge lamp has not yet been exceeded on the secondary-circuit side. A sudden interruption of the primary-circuit-side current flow through the transformer generates a correspondingly large induced voltage in the secondary circuit, which voltage allows the discharge lamp to arc through. In the case of the flyback converter, the voltage leading to lamp ignition thus arises in the secondary circuit at an instant at which no current flows through the transformer on the primary-circuit side.

The countervoltage pulse that then follows is generated by again permitting the current flow through the transformer on the primary-circuit side and by a correspondingly temporally directly coupled induced voltage in the secondary circuit. Owing to this direct temporal coupling between the primary-circuit-side current flow through the transformer and the induced voltage which leads to the ignition in the discharge lamp, the ballast in this case operates as a forward converter.

In connection with the fact that during the charging of the transformer prior to the first ignition effected by a flyback converter, the ignition voltage of the discharge lamp should not yet be exceeded, it holds true for the countervoltage pulse leading to the back ignition, however, that in this case, as a result of the counterpolarization already present in the discharge lamp, there is no need for a once again identical magnitude of the countervoltage pulse—taking account of the different steepnesses. It is not necessary, therefore, to amplify the current flow in this forward converter phase on the primary-circuit side relative to the previous charging in a particular way or, conversely, to attenuate it during the transformer charging.

The method preferably proceeds further in such a way that the primary-circuit-side current flow through the transformer is permitted to continue until the primary circuit again progresses with charging of the transformer. In the interim, a backflow after the back ignition of residual energy still remaining on the secondary-circuit side can take place via the transformer into the primary circuit.

It is also possible, of course, to prolong this temporal transition from the feeding-back of energy until the recharging of the transformer by interrupting the primary-circuit-side current flow through the transformer in the meantime, if this is desired for particular reasons, for instance for the purpose of obtaining a correspondingly long dead time of the active power coupling-in. However, this complicates the operating method, so that it is preferred to choose the design such that the feeding-back of energy together with the recharging of the transformer has, overall, a suitable temporal extent.

On the other hand, if this feeding-back of energy lasts for a relatively long time and it would be desirable to temporally shorten the dead time until the next active power coupling-in, then it is possible, according to the invention, to provide additional feeding-back circuits in order to finish the feeding-back more rapidly. By way of example, branches between the secondary circuit and the primary circuit which are provided with corresponding diode circuits are suitable for this purpose. This may be relevant principally when the time period between the first ignition and the back ignition is already considered as a dead time and the secondary circuit correspondingly oscillates at a low frequency.

The previous description was based on a control of the primary-circuit-side current flow through the transformer. To that end, it is necessary to provide a corresponding switch in the primary circuit for primary-circuit clocking of the ballast. However, the invention can also be understood more generally than in the sense of primary-circuit clocking, for instance through clocking with a switching device in the secondary circuit.

In the case of the primary-circuit clocking dealt with hereinbefore, there results according to the invention, in the simplest case, a simple changeover of the corresponding primary-circuit switch between a conducting state for charging the transformer into a nonconducting state for generating the first voltage pulse for the first ignition with the flyback converter, back into the conducting state for generating the second countervoltage pulse for the back ignition. In this case, the conducting state, as already explained, can be maintained until the next operating cycle. Thus, a simple switch-on/off operation of the primary-circuit switch already leads to the invention's combination principle comprising flyback converter and forward converter with a forward ignition and a back ignition in the discharge lamp.

With regard to the generation of a sufficiently fast countervoltage pulse in the forward converter phase, it is of importance that the power source in the primary circuit has a correspondingly low impedance. A storage capacitor is preferably used for this purpose, ceramic multilayer capacitors being a particularly favorable choice with regard to the internal resistance. These ceramic multilayer capacitors furthermore have the advantage of exhibiting a certain low-pass filter effect and of thus reducing the back perturbation of high-frequency interference from the ballast into the supply network. Moreover, they exhibit significantly longer services lives than the electrolytic capacitors that are usually used.

As already mentioned several times, the entire ballast and thus also the operation of the discharge lamp can be clocked by a switch in the primary circuit and correspondingly controlled current flow through the primary-circuit side of the transformer. Such primary-circuit clocking is a preferred choice in the case of this invention. It must be noted, however, that other possibilities for clocking the ballast and the discharge lamp also lie within the scope of the invention, for instance by means of a switching device in the secondary circuit.

A further preferred refinement of the invention relates to a secondary winding of the transformer having a center tap, in the case of which safety improvements and an improvement of the electromagnetic compatibility can be achieved by choosing the center tap potential as floating reference-ground potential in the secondary circuit and supplying the discharge lamp by the positive and negative voltages with respect to said reference-ground potential at the external taps of the secondary winding. This is essentially due to the fact that in the secondary circuit, with regard to the high-voltage danger and the electromagnetic radiation, essentially half the voltage actually applied to the discharge lamp occurs. Furthermore, the radiated interference signals partly cancel one another out on account of the edges in opposite directions.

Up to this point, mention has been made of a voltage pulse which is impressed into the secondary circuit from the primary circuit via the transformer and leads to an external voltage across the discharge lamp. In this case, the invention is not restricted in respect of whether temporally successive external voltage pulses across the discharge lamp always have the same sign or perform a sign change in some way. In many cases it is preferred to work with a unipolar operating method, in which the external voltage across the discharge lamp which is generated by a voltage pulse always has the same sign. In this case, therefore, the current direction of a "forward ignition" is always the same. One advantage of this method is e.g. that, with regard to the electrode structure of the discharge lamp, a distinction can be made between cathodes and anodes, only the anodes having to have a dielectric layer for isolation from the discharge medium.

On the other hand, a bipolar operating method may alternatively be preferred, in which the sign of the external voltage across the discharge lamp changes alternately from voltage pulse to voltage pulse. However, it is then necessary to use discharge lamps in which all electrodes are suitable as anode, that is to say have a dielectric layer.

One advantage of a bipolar operating method may, for example, consist in a balancing of the discharge conditions in the lamp, said balancing going still further beyond the back ignition principle according to the invention. Problems caused by asymmetrical discharge conditions are thus avoided particularly effectively, e.g. instances of ion migration in the dielectric which can lead to blackening, or space charge accumulations which impair the efficiency of the discharge.

With regard to the operating method according to the invention, it is preferred, if bipolar operation is intended, that, for this purpose, provision be made for a direction reversal of the primary-circuit-side current in the transformer, said current effecting the voltage pulse in the secondary circuit. This is generally simpler than taking corresponding electrical-engineering measures for direction reversal on the secondary-circuit side.

In particular, the transformer may have, for this purpose, two primary-circuit-side windings which are respectively assigned to one of the two current directions, that is to say are used for a primary-circuit current of only one of the two directions. This means that current is alternately applied to the two primary-circuit-side windings. By way of example, this can be done by using two clocking switches in the primary circuit which respectively clock the current through an assigned winding of the two windings. As a result, each of the two current directions is assigned a dedicated clock switch and a dedicated primary-circuit-side winding of the transformer.

If a ballast according to the invention is used on an alternating-current source, it may be advantageous, with regard to the two primary-circuit-side current directions, to use two storage capacitors which are alternately charged from the alternating-current source in a half-cycle by half-cycle manner. In other words, the alternating-current half-cycles of one sign are used for one of the storage capacitors and the alternating-current half-cycles of the other sign are used for the other storage capacitor. The currents for a respective direction can then be drawn from these two storage capacitors. This can be done together with the depicted double embodiment of the primary-circuit winding of the transformer, but this is actually not necessary here. Instead, a single primary-circuit-side winding can be supplied alternately by the two storage capacitors by means of corresponding switches, each storage capacitor being respectively assigned to a current direction. In order to feed the storage capacitors from the alternating-current source, it is possible to use a corresponding rectifier circuit whose details are clear to the person skilled in the art without further elaboration.

DESCRIPTION OF THE DRAWINGS

The invention is explained in detail below using concrete exemplary embodiments. The features disclosed in the process may also be essential to the invention in each case individually or in different combinations from those represented. In the figures.

Figure 1:
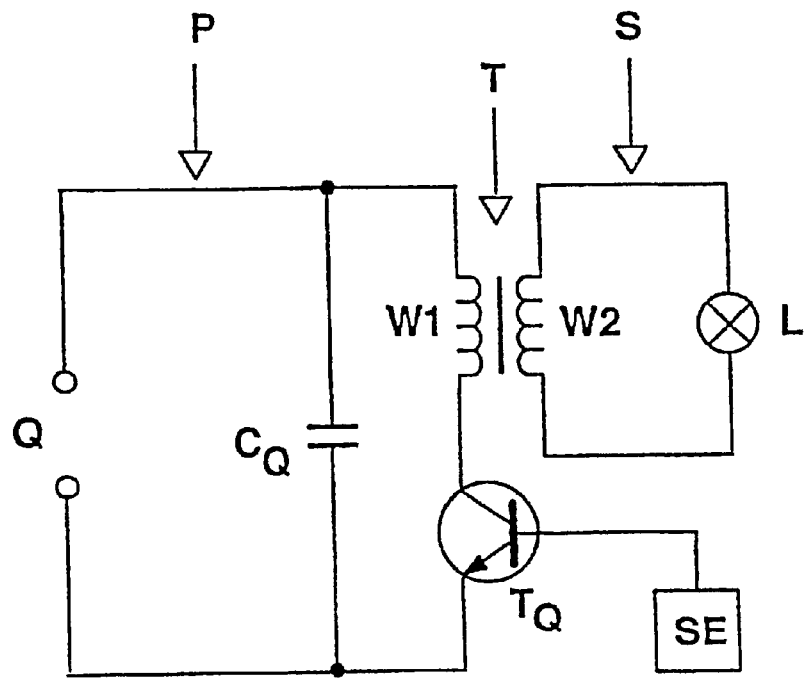
FIG. 1 shows a schematic block diagram of an illumination system according to the invention.

A schematic block diagram for an illumination system according to the invention is represented in FIG. 1, in which, firstly, L represents a discharge lamp which is designed for dielectrically impeded discharges. A basic equivalent circuit diagram for the discharge lamp L will be explained below with reference to FIG. 2. The actual construction of the discharge lamp L is not crucial for understanding the operating method, illumination system and ballast according to the invention.

The discharge lamp L is connected into a secondary circuit S containing, in addition to the discharge lamp L, a secondary winding W2 of a transformer T.

The primary winding W1 of the transformer T is located in a primary circuit P, which is supplied with power for the transformer and the discharge lamp L from a power supply Q.

Furthermore, a fast switch $T_Q$ is located in one of the branches between the power source Q and the primary winding W1. This switch is a power MOSFET which is switched or controlled by a control device SE.

A storage capacitor $C_Q$ is connected in parallel with the series circuit comprising the primary winding W1 and the switch $T_Q$. This storage capacitor $C_Q$ is recharged by the source Q, basically belongs to the source Q and serves for the application of a voltage to the primary winding W1 depending on the switching state of the switch $T_Q$. This involves ceramic multilayer capacitors.

In the case of the flyback/forward converter according to the invention, firstly a current flow through the primary winding W1 is produced, the turns ratio of the transformer T with regard to the discharge lamp L being designed in such a way that the current flow through the primary winding W1 induces in the secondary winding W2, and thus directly across the discharge lamp L, a voltage which is not sufficient for a first ignition. If the switch $T_Q$ is opened by the control device SE, then the current through the primary winding W1 abruptly terminates and generates an ignition voltage pulse in the secondary circuit S. The operation thus far corresponds to a conventional flyback converter.

In the case of use with the discharge lamp according to the invention, energy at least in the form of a residual magnetization of the transformer T remains in the secondary circuit S in the flyback converter phase after the opening of the switch $T_Q$. As already explained in the introduction to the description, demagnetization circuits have conventionally been used to reduce said residual magnetization, which might comprise e.g. a third winding of the transformer T and a diode connected with said winding in parallel with the series circuit comprising the primary winding W1 and the switch $T_Q$. Using such a demagnetization circuit, the residual magnetization of the transformer T could then be reduced in the off phase of the switch $T_Q$.

It is directly apparent from FIG. 1 that there is complete DC isolation between the primary circuit P and the secondary circuit S. This is a considerable safety advantage with regard to the high voltages present on the secondary-circuit side. A further safety advantage can be achieved by virtue of the fact that the secondary winding W2 has a (third) center tap which can serve as "floating" reference-ground potential of the secondary circuit S. By contrast, if the positive and negative pulses from the secondary winding W2 are applied to the respective electrode groups of the discharge lamp L, the full induced voltage is still present across the discharge lamp L, although in each case only half the maximum voltage occurs as safety-relevant voltage in the secondary circuit relative to the center tap potential.

This technology also considerably improves the electromagnetic compatibility with regard to radiation from the secondary circuit. Reference is made to DE 197 34 885. C1.

Figure 2:
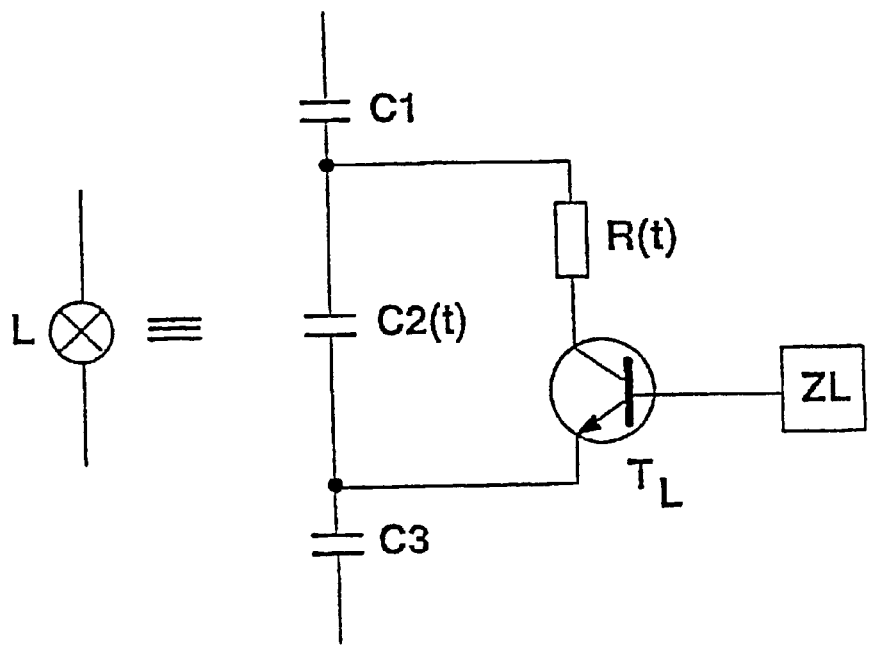
FIG. 2 shows a schematic equivalent circuit diagram for the discharge lamp from FIG. 1.
Figure 3:
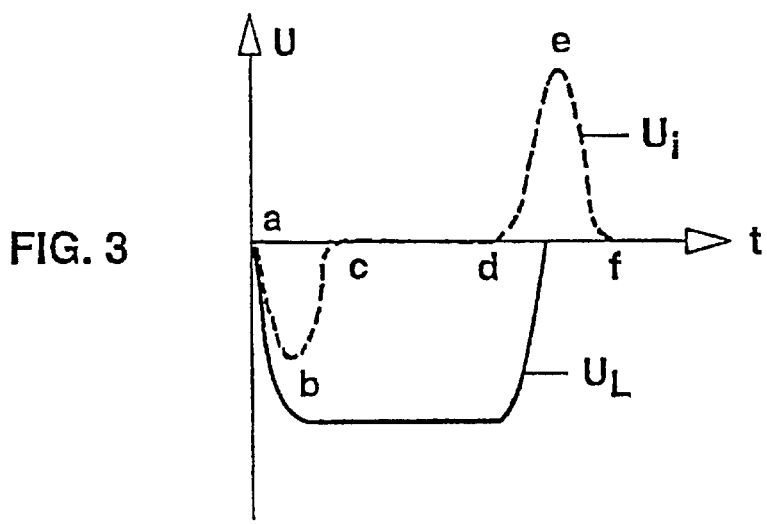
FIG. 3 shows a greatly simplified diagram for illustrating the relationship between the external voltage and the internal counterpolarization across and in the discharge lamp.

Before the invention's embodiment of the illumination system illustrated in FIG. 1 is described, the electrical behavior of the discharge lamp L shall firstly be considered in more detail with reference to FIGS. 2 and 3. During the ignition operation according to the flyback converter principle already described, the transformer T generates an ignition voltage pulse in the secondary circuit S after preceding charging by a primary-circuit-side transformer current with the sudden interruption of this transformer current. In this case, the illumination system is designed in such a way that the current discharge of the primary-circuit-side transformer current together with the transformation ratio of the transformer T prior to the opening of the switch $T_Q$ does not yet lead to an ignition voltage across the discharge lamp L. Only the high time derivative upon the switch-off of the transformer current in the primary circuit leads to the ignition voltage being reached.

Discharges in which charge carriers move to the dielectric layer on the electrodes form in the discharge medium of the discharge lamp L. In this connection, gas discharge lamps which are preferably considered are ones in whose gas space the electrons are the far more mobile charge carriers and thus practically solely determine the discharge dynamics with respect to the ion cores. When the electrons have moved to the dielectric layer on the anode, they accumulate on the surface of the dielectric layer and increasingly shield the electric field generated by the external voltage.

In this connection, it should be noted that in the case of the circuit variant illustrated in FIG. 1, the external voltage always has the same polarity, if an anode is fixed in the discharge lamp L. As already mentioned, however, this does not restrict the invention to unipolar operating methods; rather, the scope of the invention also includes bipolar methods and illumination systems in which the polarity of the external voltage alternates, that is to say the electrodes are alternately operated in the anode role and the cathode role. This will be explained with reference to FIG. 8.

To come back to the shielding, just described, of the field generated by the external voltage, this is effected with a time delay defined by various parameters of the discharge lamp L (pressure and composition of the discharge atmosphere, electrode geometry, dimensions of the discharge volume . . . ). This shielding can then extinguish the discharge in the discharge lamp L, even though the external voltage lies above the required ignition voltage.

This can be discerned in the simplified diagram in FIG. 3, where the time t is plotted on the abscissa and the voltage U is plotted on the ordinate. In this case, the solid line shows the external voltage $U_L$ and the broken line shows the internal voltage $U_i$ which results from the superposition of the external voltage $U_L$ and the internal counterpolarization and corresponds to the field actually prevailing in the discharge medium.

In accordance with the previous description, the external voltage $U_L$, proceeding from the point a, has risen rapidly toward negative values in the diagram in FIG. 3, while the internal voltage $U_i$, proceeding from a, has increasingly decoupled from the external voltage $U_L$. The plasma ignites in the progression from a to b. Even before the plasma ignition, there arises an internal counterpolarization and thus a deviation of the internal voltage $U_i$ from the external voltage $U_L$. At the point b, the internal voltage reverses in the time derivative and, as a result of the increasing internal counterpolarization, becomes smaller and smaller until it reaches the value zero at c. In this example, the internal voltage $U_i$ reverses before the external voltage $U_L$ reaches its maximum.

To afford a better understanding, the maximum of the external voltage $U_L$ is depicted with a somewhat exaggerated width. This is intended to illustrate that field freedom prevails in the lamp and a discharge can no longer be maintained while the external voltage $U_L$ still has large values, possibly even the maximum value.

In the equivalent circuit diagram from FIG. 2, this means that the discharge lamp L has changed over from a load behavior as a time-dependent ohmic resistor R(t) with the extinguishing of the discharge to a purely capacitive behavior as a capacitor. This can be imaged in the diagram in FIG. 2 by a switching operation of the model-like switch $T_L$, which is to an extent controlled by an ignition logic ZL of the discharge lamp L. The capacitances C1 and C3 that are furthermore depicted in the circuit diagram in FIG. 2 are capacitances of the electrodes and of the dielectric layer applied at least on the anodes. In this case, dielectric layers may also be present both on the anodes and on the cathodes.

In the unignited or even no longer ignited state, the discharge lamp L thus acts as a series circuit of capacitors.

An essential aspect of the invention resides, then, in coordinating the overall system (designated here as illumination system) comprising the discharge lamp L and the ballast in such a way that the time constant which occurs with regard to the reaction of the internal counterpolarization can be utilized for the intended back ignition. This can be discerned in the right-hand part in FIG. 3, in which, as a result of the drop in the external voltage $U_L$, the internal counterpolarization which is not decreasing in a directly following manner then builds up an internal voltage $U_i$ which rises in the opposite direction, that is to say toward positive voltages in FIG. 3, to a level above the ignition voltage limit. This is manifested in the rise of the broken curve of the internal voltage $U_i$ between the points d and e.

After the drop in the external voltage $U_L$, the internal voltage, that is to say the internal counterpolarization in this case of disappearing external voltage $U_L$, falls again from the point e to the point f. In this case, the point where the external voltage $U_L$ disappears need not necessarily coincide with the maximum of the internal voltage $U_i$. All that is essential is that the external voltage $U_L$ fall so rapidly that the internal counterpolarization reacts comparatively so slowly that the ignition voltage can be exceeded a further time in the opposite direction.

In the equivalent circuit diagram for the discharge lamp L as illustrated in FIG. 2, the time profile from d to f in FIG. 3 signifies that the switch $T_L$ is switched on again by the ignition logic ZL, but in this case the time-dependent resistance R(t) assumes formally negative values.

Figure 4:
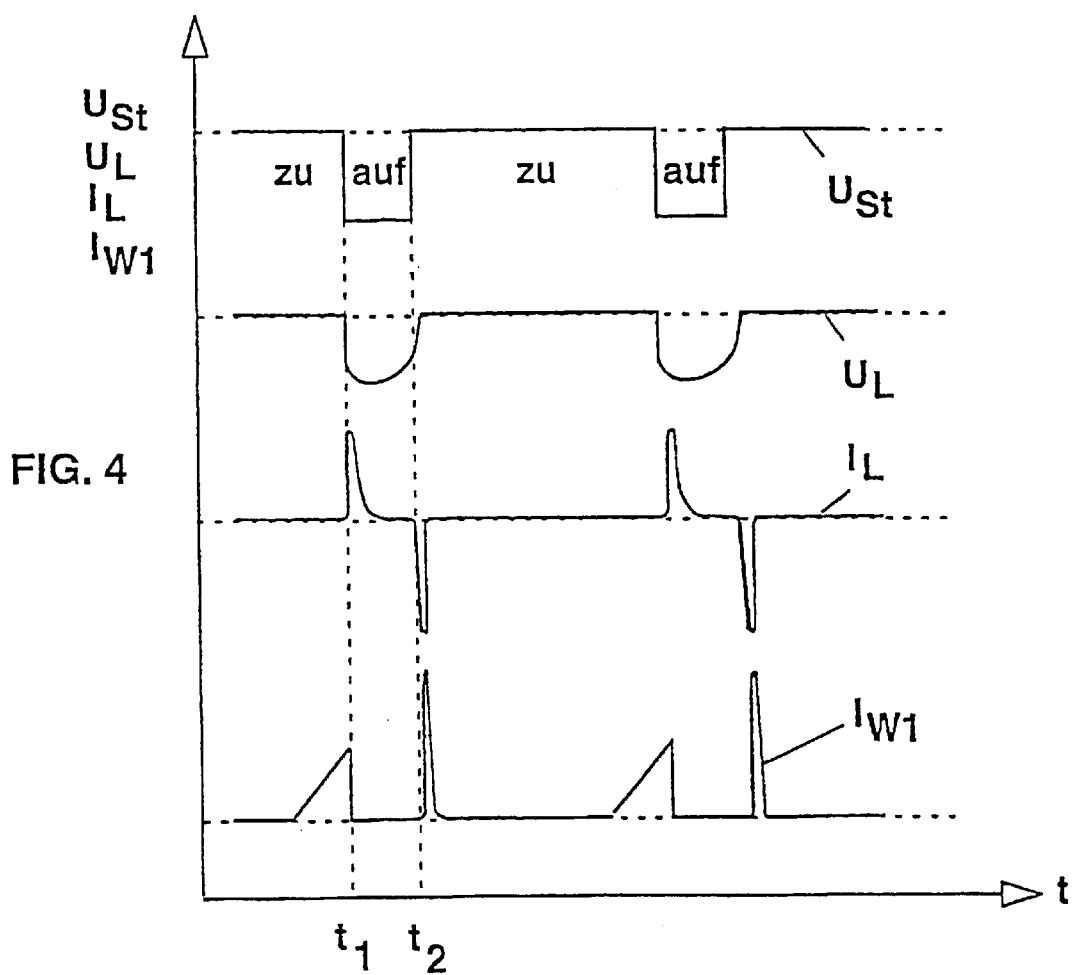
FIG. 4 shows a greatly simplified diagram for illustrating the basic principle of the flyback converter/forward converter ballast according to the invention.

FIG. 4 then illustrates how the illumination system illustrated in FIG. 1 achieves the fall in the external voltage $U_L$ in the manner according to the invention. To that end, this figure illustrates the control voltage $U_{st}$ from the control device SE for the switch $T_Q$, underneath that the external voltage $U_L$ present across the discharge lamp L, underneath that the current IL through the discharge lamp L, and right at the bottom the transformer current $I_{W1}$ through the primary winding W1.

As a result of the primary-circuit clocking with the aid of the switch $T_Q$ and the control device SE, the primary winding W1 of the transformer T is conductively switched into the primary circuit P before the instant designated by $t_1$, is switched out of the primary circuit P between the instants $t_1$ and $t_2$, is conductive again after the instant $t_2$, and so on periodically. As a conventional flyback converter, the ballast, prior to the instant $t_1$, produces charging of the transformer T by the primary-circuit current $I_{W1}$, which rises essentially linearly in a manner corresponding to the inductance of the transformer. In the process, the ignition voltage threshold of the discharge lamp L is undershot, FIG. 4, in an idealizing manner, not showing any excursion in the lamp voltage $U_L$.

At the instant $t_1$, the switch To is opened, as a result of which the primary-circuit-side current flow $I_{W1}$ is interrupted. Accordingly, an induced voltage rising relatively rapidly is produced in the secondary circuit S, and leads to the discharge lamp L arcing through. This can be seen from the first, positive (in FIG. 4) excursion in the lamp current $I_L$.

In accordance with the behavior of the discharge lamp L already described, the discharge space in the discharge lamp L becomes increasingly field-free, as a result of which the discharge is extinguished. In this case, the lamp current $I_L$ falls again relatively soon, even though the voltage $U_L$ present across the discharge lamp L remains in the vicinity of its maximum value.

Even before the lamp voltage $U_L$ in the secondary circuit S, now acting as an isolating resonant circuit, has fallen to an excessively great extent, the control device SE switches the switch $T_Q$ back into the conducting state at the instant $t_2$. An induced voltage is produced in the secondary winding W2 of the transformer T, which allows the lamp voltage $U_L$ that has already fallen somewhat to fall further in a greatly accelerated fashion. Accordingly, the internal counterpolarization, which does not follow this fall in the external voltage $U_L$ sufficiently rapidly, ignites in the discharge lamp L a back ignition, as is represented by the negative (in FIG. 4) excursion of the lamp current $I_L$ at the instant $t_2$.

The rapid fall—"triggered" from the primary circuit P—in the lamp voltage $U_L$ after the instant $t_2$ is connected with a charge transfer in the secondary circuit S, because the lamp voltage $U_L$ is linked to charges bound capacitively on the discharge lamp L. This charge reversal process requires a relatively large, short current pulse in the primary circuit P, which is depicted as a narrow excursion in the primary winding current $I_{W1}$ shortly after the instant $t_2$.

The switch $T_Q$ subsequently remains in the conducting state for a certain time, whereupon the method just described can begin periodically anew. FIG. 4 shows, in a greatly simplified manner, two periods of the operating method according to the invention. In this case, as already explained, the principle of this invention enables a relatively short interval between the instants $t_1$, and $t_2$ and thus between the first ignition and the back ignition, while the time interval between a back ignition and the subsequent "forward ignition" is considered as dead time in the sense of the pulsed mode of operation.

Figure 5:
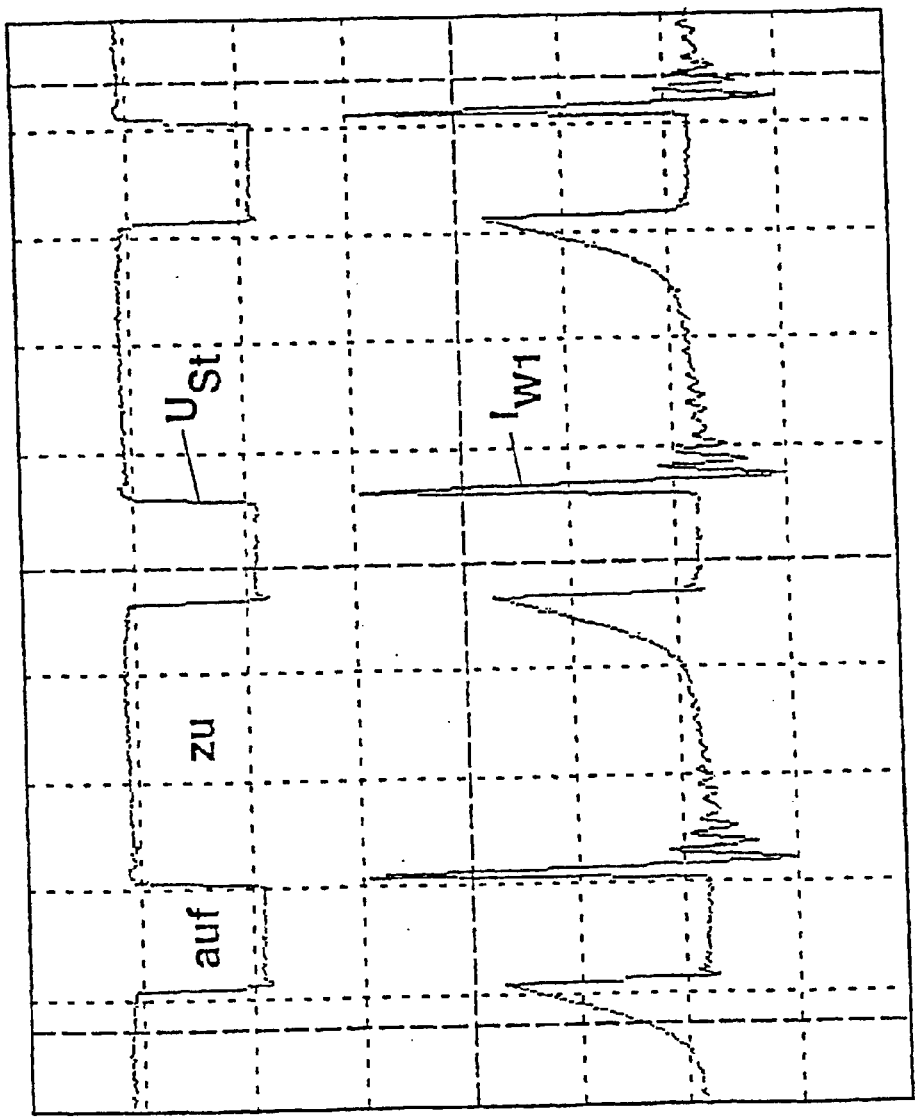
FIG. 5 shows exemplary measurement curves for an actual operation of a flyback converter/forward converter ballast according to the invention.
Figure 6:
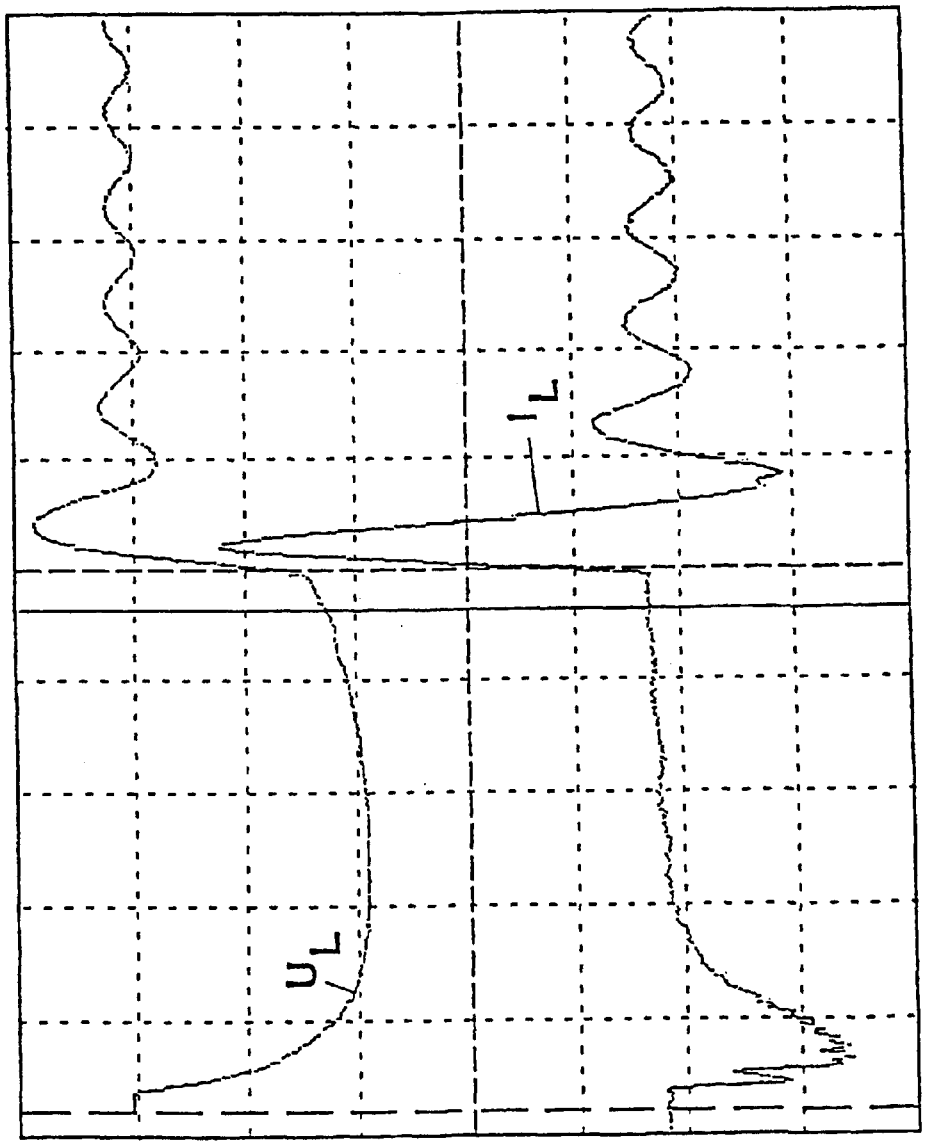
FIG. 6 shows a diagram with further exemplary measurement curves for the actual operation of the flyback converter/forward converter ballast according to the invention.
Figure 7:
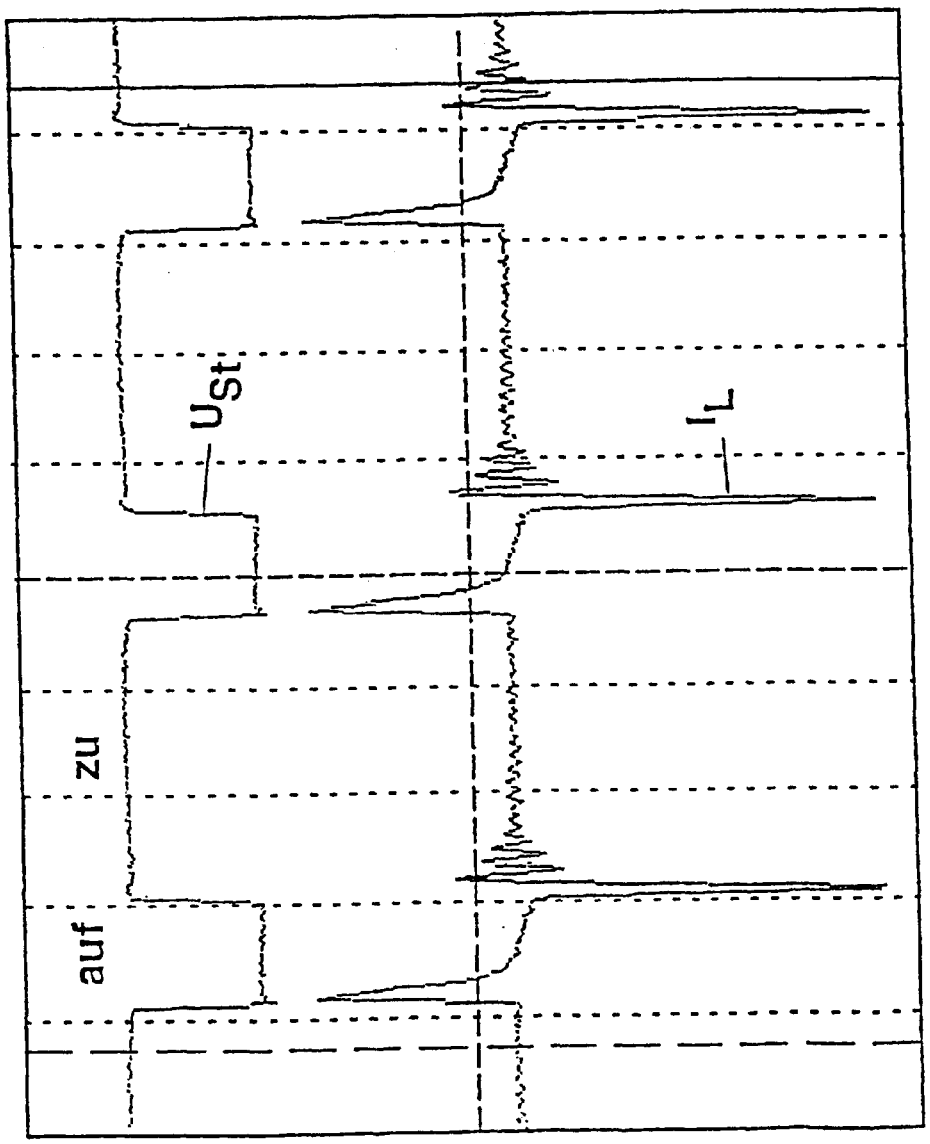
FIG. 7 shows a diagram with in each case one of the measurement curves from FIG. 5 and FIG. 6 for producing a correlation between these figures.

A more realistic impression is conveyed by FIGS. 5, 6 and 7, which in principle show the same quantities as FIG. 4 but without the high degree of schematic representation in FIG. 4. Note the magnified time scale for resolving a number of details in FIG. 6; in the latter, one abscissa unit corresponds to 1 $\mu$sec, while the abscissa unit in FIGS. 5 and 7 is five $\mu$s. Moreover, the lamp current $I_L$ is shown inverted in FIG. 6 by comparison with FIGS. 4 and 7.

Firstly, FIG. 5 reveals the primary-circuit clock signal $U_{st}$ in the upper area, and underneath the primary winding current $I_{W1}$ which is switched as a result of said signal. Once again, it is possible to discern the continuous rise in the primary winding current $I_1$ in the charging phase prior to the opening of the switch $T_Q$, the sudden fall to zero, and also the relatively short charge-reversal spike having a relatively large amplitude (during the back ignition) after the switch $T_Q$ has been switched on again. The illustration thus far corresponds practically identically to the schematic diagram explained with reference to FIG. 4. Furthermore, in the actual measurement curve for $I_{W1}$, a number of oscillations are manifested after the charge-reversal spike, but these are attenuated away before the next charging operation actually begins. These oscillations are of a parasitic nature, do not adversely affect the principle according to the invention and are also not necessary for understanding it.

FIG. 6 reveals the two further quantities which are schematically illustrated in FIG. 4, namely the external voltage $U_L$ present across the lamp and also the lamp current $I_L$. A correlation between FIGS. 5 and 6 is made possible by FIG. 7, which shows the lamp current $I_L$ with the primary-circuit clock signal $U_{st}$ already illustrated in FIG. 5. In FIG. 6, by comparison, a higher time resolution has been chosen. In this case, the left-hand half of FIG. 6 essentially shows the temporal region in which the switch $T_Q$ is open, that is to say the region between the instants $t_1$ and $t_2$ in FIG. 4. In this case, it is apparent firstly that, after the opening of the switch $T_Q$, the lamp voltage $U_L$ does not rise rapidly in the same way as the primary winding current $I_{W1}$ decreases. This is caused by the charge-reversal time delay in the secondary circuit S on account of the finite ohmic resistances and the lamp capacitance.

As the magnitude of the lamp voltage $U_L$ increases, the lamp current $I_L$ also increases, to be precise firstly as a dielectric displacement current and then on account of the first ignition in the discharge lamp L.

Before the magnitude of the lamp voltage $U_L$ has actually reached its maximum, the discharge in the discharge lamp breaks down and the lamp current $I_L$ falls to zero again.

After a certain drop in the magnitude of the lamp voltage $U_L$, the result, as shown in FIGS. 5 and 7, is once again a primary winding current $I_{W1}$ and, on account of the latter, a very fast fall in the lamp voltage $U_L$. Immediately accompanying that, the internal counterpolarization ignites in the discharge lamp L in the opposite direction, as clearly shown by FIG. 6. In the case of this countervoltage pulse, the primary winding current $I_{W1}$ and the lamp current $I_L$, that is to say the secondary circuit current, correspond approximately both with regard to the temporal commencement and their duration; in this case, therefore, the secondary circuit draws energy directly from the primary circuit according to the forward converter principle. The charge-reversal time delay in between is hardly discernible in the figures.

The quantities $U_L$ and $I_L$ also show the postoscillations already explained with reference to FIG. 5 with regard to the primary winding current $I_{W1}$. These attenuated resonances correspond to a total oscillation—coupled through the transformer T—of the illumination system both in the primary circuit P and in the secondary circuit S and are triggered by the relatively sharp primary-side and secondary-side current and voltage surges after the switch $T_Q$ has been switched on again.

As can already be seen in FIG. 4, but is not discussed there, the primary winding current $I_{W1}$ is relatively small after the back ignition of the discharge lamp L for a relatively extended period of about 8 μsec. On the other hand, the primary-circuit switch $T_Q$ is closed in this period of time. It is apparent from this that energy still remaining in the secondary circuit S after the back ignition is fed back into the primary circuit, i.e. onto the storage capacitor $C_Q$, via the transformer T in this period of time. Only when the feeding-back has concluded does the charging current - clearly discernible in FIG. 5—commence again in the primary circuit. Besides other parameters, above all the capacitance of the discharge lamp is essential for this feeding-back.

Figure 8:
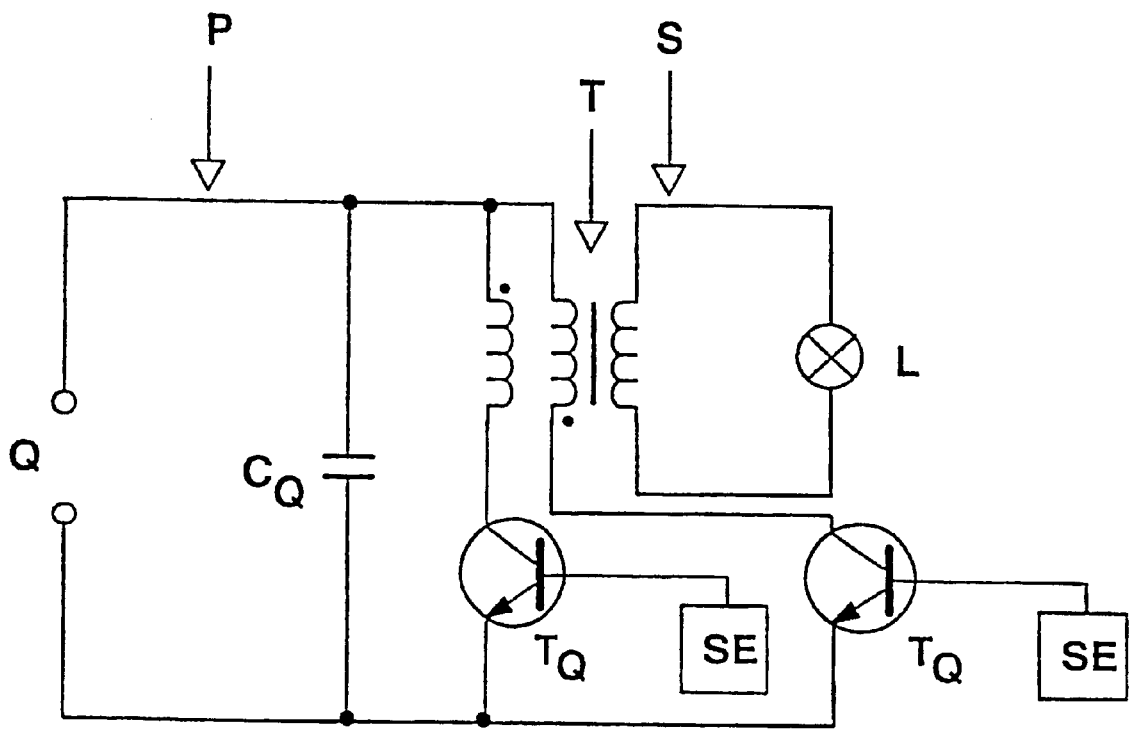
FIG. 8 shows a schematic block diagram—corresponding to FIG. 1—of a further illumination system according to the invention.

FIG. 8 shows a schematic circuit diagram which largely corresponds to FIG. 1. In this case, however, an exemplary embodiment which is designed for a bipolar operating method is shown. Thus, external voltage pulses of alternating polarity are applied to the discharge lamp L. To that end, the transformer T has two primary windings depicted with opposite winding senses in FIG. 8. Each of the primary windings is electrically connected in series with an assigned switching transistor $T_Q$ with a dedicated control device SE. Of course, the two control devices can also be understood as two functions of a uniform control device; all that is intended to be symbolized is that the two primary windings are clocked alternately rather than jointly. As a result of the winding sense reversal between the two primary windings, the transformer T, upon the clocking of the primary windings, in each case generates voltage pulses of opposite polarity in the secondary circuit S. For the rest, the function corresponds entirely to the previous exemplary embodiment illustrated in FIG. 1. In summary, in the case of the circuit from FIG. 1, the assembly comprising the primary winding W1, the switch $T_Q$ and the control device SE is doubly embodied, a sign inversion being effected by the winding sense. The curve profiles of the various electrical quantities correspond—apart from the change of sign—to the illustrations in FIGS. 5–7.

In the manner illustrated, the invention utilizes the specific properties of a discharge lamp L with dielectrically impeded electrodes in order to provide an extremely simple electronic ballast which nevertheless has outstanding operating properties. What is essential in this case is the particular switching behavior of the switch $T_Q$ on account of the control by the control device SE. Furthermore, a significant part is played by the suitable coordination of the electrical engineering quantities and of the switching behavior with the respective lamp parameters. Therefore, the invention relates not only to the operating method but also to the correspondingly coordinated illumination system and also to a ballast provided with the control device according to the invention.

In addition to the simple structure of the ballast, the latter also has a quite considerably smaller structural volume and smaller weight than the comparable prior art because not only are fewer components used but also a design for smaller power levels is possible, in particular on the side of the primary circuit P.

In a construction example, the small structural size led to a volume which can be accommodated in a housing construction similar to a double matchbox. This affords considerable advantages with regard to installation possibilities in flat screens, in which the discharge lamps considered here are of major interest as backlighting systems. An essential advantage of such flat screens consists precisely in their small structural size in comparison with conventional electron beam tubes, but said small structural size consequently also leaves only a small volume for installing a backlighting system. In this case, the flat radiators with dielectically impeded discharges which can typically be made very flat can be used highly advantageously in conjunction with the ballasts according to the invention.

In addition to the possible application as an illumination system for a flat screen, a further example shall be presented here. In this respect, reference is made to DE 197 18 395 C1, whose disclosure content is incorporated here with regard to the structures, the properties of the copying lamp described therein, and also the application possibilities thereof. The copying lamp represented in principle therein was tested with the following concrete data in the case of an illumination system according to the invention. With a rod-type copying lamp having a length of 30 cm and an external diameter of 8 mm with a tube wall of 0.6 mm, a flashover distance of 6.5 mm resulted for the dialectically impeded discharges. The dielectric barriers each had a thickness of approximately 170 μm and were composed of glass solder on which, as on the remaining wall, $TiO_2$ and luminescent material were deposited. The $TiO_2$ is recessed in the region of an aperture. With a filling of 160 Torr xenon, an average lamp power of 11 W resulted using a unipolar electronic ballast according to the invention, having the following components: four ceramic multilayer capacitors each of 10 μF were used as storage capacitors $C_Q$ of the source Q supplied with 12 V DC voltage. The switch $T_Q$ was an RFP 70 N 80 transistor. The transformer was a single ETD 29, N 67 with a six-chamber coil former and a turns ratio of 1:45. In the manner just described, work was carried out with a center tap on the secondary side, which is not illustrated in FIG. 1 for the sake of simplicity. A very lightweight and compact electronic ballast with a volume of a double matchbox was produced, which, moreover, exhibited a very good electromagnetic compatibility both with regard to radiation from the secondary circuit and with regard to back perturbation into the power supply system.

In the case of the copying lamp considered here, the essential advantage is that the electronic ballast can travel with the holding device for the copying lamp itself during copying operation, that is to say can be mounted directly beside the copying lamp. By virtue of the considerably reduced lead lengths and by virtue of the resultant immobility of the leads, significant advantages are produced with regard to the safety, durability and reliability of the high-voltage lines between the electronic ballast and the copying lamp. The lead capacitances are also reduced as a result, for which reason the electronic ballast in conjunction with the low capacitance of the copying lamp itself can generate a very good pulse shape.

The obviation of the need to mount a moving high-voltage line means that many conventionally necessary components are also omitted and the assembly outlay when producing a copier is thus considerably reduced.

Analogous advantages also apply to other applications of such linear radiators in the context of document illumination in fax machines, scanners, etc.

A further essential area of application for the invention is in the field of the electrical supply of flat radiators for dielectrically impeded discharges. In this respect, reference is made to WO98/43277. The disclosure content of this application is incorporated here by reference.

What is claimed is:

1. An operating method for a discharge lamp (L) having a dielectric layer between at least one electrode and a discharge medium
    using a ballast having a power-supplied primary circuit (P), a secondary circuit (S) containing the discharge lamp (L), and also a transformer (T) which connects the primary circuit (P) to the secondary circuit (S),
    in which method a voltage pulse is impressed on the secondary circuit (S) from the primary circuit (P) via the transformer (T), which voltage pulse leads to an external voltage (UL) effecting an ignition across the discharge lamp (L) and to an internal counterpolarization in the discharge lamp (L),
    and, after the ignition by the external voltage (UL), a sufficiently early countervoltage pulse is impressed from the primary circuit (P) via the transformer (T) into the secondary circuit (S) and withdraws the charge effecting the external voltage (UL) still present across the discharge lamp (L), until the internal counterpolarization in the discharge lamp (L) leads to the back ignition,
    wherein the voltage pulse is impressed according to the flyback converter principle, and the countervoltage pulse according to the forward converter principle, from the primary circuit (P) into the secondary circuit (S).

2. The operating method as claimed in claim 1, in which, after the back ignition by the internal counterpolarization, the primary-circuit-side current flow through the transformer (T) is permitted to continue in order to enable a backflow of energy remaining after the back ignition from the secondary circuit (S) into the primary circuit (P) until the voltage pulse is again impressed into the secondary circuit (S).

3. The operating method as claimed in claim 1, in which the countervoltage pulse is impressed into the secondary circuit (S) so early that the ignition by the external voltage (UL) and the back ignition act as a uniform active power pulse of a pulsed active power coupling-in method.

4. The operating method as claimed in claim 1, in which the frequency of the oscillations of the secondary circuit (S) is so low, and the countervoltage pulse is impressed into the secondary circuit (S) so late, that the time period between the ignition by the external voltage (UL) and the back ignition acts as the dead time of a pulsed active power coupling-in method.

5. The operating method as claimed in claim 1, in which the transformer (T) of the ballast is demagnetized by the back ignition.

6. The operating method as claimed in 1, in which the electronic ballast is clocked by a switch (TQ) in the primary circuit (P).

7. The operating method as claimed in claim 1, in which the primary circuit (P) is supplied with power from a source (Q) with ceramic multilayer capacitors (CQ).

8. The operating method as claimed in claim 1, in which, in the secondary circuit (S), a center tap of the transformer (T) is used as reference-ground potential.

9. The operating method as claimed in claim 1, in which the ballast is designed to apply to the discharge lamp (L) external voltages (UL) having a sign which alternates from voltage pulse to voltage pulse.

10. The operating method as claimed in claim 9, in which the direction of the primary-circuit-side current (IW1) in the transformer (T) alternates from voltage pulse to voltage pulse.

11. The operating method as claimed in claim 10, in which the transformer has two primary-circuit-side windings (W1), which are respectively assigned to one of the two current directions.

12. The operating method as claimed in claim 11, in which, in the secondary circuit (S), a center tap of the transformer (T) is used as reference-ground potential, and in which the primary circuit has two switches (TQ), which respectively clock the current through one of the two windings (W1).

13. The operating method as claimed in claim 10, in which the primary circuit is supplied from an alternating-current source which alternately charges two storage capacitors in a half-cycle by half-cycle manner, each storage capacitor respectively being assigned to one of the two current directions.

14. A ballast for a discharge lamp (L) having a dielectric layer between at least one electrode and a discharge medium,
    having a power-supplied primary circuit (P), a secondary circuit (S) for the discharge lamp (L) and also a transformer (T) which connects the primary circuit (P) to the secondary circuit (S),
    wherein the ballast is a combined flyback converter/ forward converter and has a switching device (TQ, SE) in the primary circuit (P), which switching device is designed for interrupting the primary-circuit-side current flow (IW1) through the transformer (T) for the purpose of impressing a voltage pulse into the secondary circuit (S) in order to generate in the discharge lamp (L) an external voltage (UL)—effecting an ignition— and a counterpolarization, and for then switching on again the primary-side current flow (IW1) through the transformer (T) in order, by means of a countervoltage pulse, to withdraw from the discharge lamp (L) the charge effecting the external voltage (UL) across the discharge lamp and to effect a back ignition with the aid of the internal counterpolarization in the discharge lamp (L).

15. The ballast as claimed in claim 14, in which the primary circuit (P) is supplied with power from a source (Q) with ceramic multilayer capacitors (CQ).

16. The ballast as claimed in claim 14, in which the transformer (T) has a center tap on the secondary side.

17. An illumination system having a discharge lamp (L) having a dielectric layer between at least one electrode and a discharge medium and a ballast as claimed in claim 14.

18. The illumination system as claimed in claim 17, designed to the effect that the transformer (T) of the ballast is demagnetized by the back ignition.

19. The illumination system as claimed in claim 17, in which the natural frequency of the secondary circuit (S) is less than 20 kHz.

* * * * *